United States Patent
Backes

(10) Patent No.: US 9,546,900 B2
(45) Date of Patent: Jan. 17, 2017

(54) OPTICAL SENSING DEVICE FOR DETECTING AMBIENT LIGHT IN MOTOR VEHICLES COMPRISING A PRISM STRUCTURE HAVING A PLURALITY OF PRISMS DESIGNED TO DIRECT RAYS OF A SPECIFIC AMBIENT LIGHT BEAM

(75) Inventor: Ulrich Backes, Radolfzell (DE)

(73) Assignee: TRW Automotive Electronics & Components GmbH (DE)

( * ) Notice: Subject to any disclaimer, the term of this patent is extended or adjusted under 35 U.S.C. 154(b) by 880 days.

(21) Appl. No.: 13/505,563

(22) PCT Filed: Nov. 15, 2010

(86) PCT No.: PCT/EP2010/006947
§ 371 (c)(1),
(2), (4) Date: Jun. 4, 2012

(87) PCT Pub. No.: WO2011/060911
PCT Pub. Date: May 26, 2011

(65) Prior Publication Data
US 2012/0267514 A1  Oct. 25, 2012

(30) Foreign Application Priority Data
Nov. 18, 2009  (DE) .................. 10 2009 053 825

(51) Int. Cl.
*G01J 1/44* (2006.01)
*H01J 3/14* (2006.01)
(Continued)

(52) U.S. Cl.
CPC ................ *G01J 1/04* (2013.01); *B60S 1/0833* (2013.01); *B60S 1/0877* (2013.01); *G01J 1/4204* (2013.01);
(Continued)

(58) Field of Classification Search
CPC .......... G01J 1/04; G01J 1/4204; G01J 1/0407; G01J 1/0477; B60S 1/0877; B60S 1/0833; B60S 1/0837; B60S 1/0874; G02B 5/045; G02B 3/08; G02B 5/04
(Continued)

(56) References Cited

U.S. PATENT DOCUMENTS 5,898,183 A     4/1999 Teder
6,108,084 A  *  8/2000 Winner ................. B60S 1/0822
                                                    356/338
(Continued)

FOREIGN PATENT DOCUMENTS

CN    101566695    10/2009
DE     19608648    10/1997
(Continued)

*Primary Examiner* — Tony Ko
*Assistant Examiner* — Jennifer Bennett
(74) *Attorney, Agent, or Firm* — Tarolli, Sundheim, Covell & Tummino LLP

(57) ABSTRACT

An optical sensor device for the detection of ambient light is adapted to be coupled to a pane (10), in particular to a windshield of a vehicle. The optical sensor device has a sensor unit which includes at least one light receiver (22) for ambient light and a lens plate (12) for directionally coupling an ambient light beam (26) out of the pane (10) onto the light receiver (22). The lens plate (12) has a surface (18) facing the light receiver (22) and oriented substantially parallel to the pane (10) in the coupled condition of the optical sensor device. The surface (18) includes a prism structure (20) having a plurality of single prisms (24) which are designed to direct the rays of a specific ambient light beam (26) defined by a principal direction (A) and an aperture angle onto the light receiver (22).

20 Claims, 2 Drawing Sheets

(51) Int. Cl.
*G01J 1/04* (2006.01)
*B60S 1/08* (2006.01)
*G01J 1/42* (2006.01)
*G02B 3/08* (2006.01)
*G02B 5/04* (2006.01)

(52) U.S. Cl.
CPC ............... *G02B 3/08* (2013.01); *G02B 5/045* (2013.01); *G01J 1/0407* (2013.01)

(58) Field of Classification Search
USPC ......... 250/216, 214 AL, 239, 227.25, 203.3, 250/203.4, 221, 573, 574, 576, 227.24, 250/903; 340/600, 602, 603; 359/678, 359/708, 720, 737, 796, 797, 831, 837; 356/239.8, 442, 436, 356/239.2
See application file for complete search history.

(56) References Cited

U.S. PATENT DOCUMENTS

| | | | |
|---|---|---|---|
| 6,376,824 B1 * | 4/2002 | Michenfelder et al. | .. 250/214 R |
| 7,214,918 B2 * | 5/2007 | Michenfelder et al. | ... 250/208.1 |
| 7,236,249 B1 | 6/2007 | Michenfelder et al. | |
| 7,751,054 B2 | 7/2010 | Backes | |
| 7,804,055 B2 | 9/2010 | Backes | |
| 2004/0075828 A1 | 4/2004 | Sautter et al. | |
| 2007/0096015 A1 | 5/2007 | Richwin et al. | |
| 2007/0235638 A1 | 10/2007 | Backes et al. | |
| 2009/0032689 A1 | 2/2009 | Backes | |
| 2009/0261237 A1 | 10/2009 | Backes | |
| 2009/0284735 A1 | 11/2009 | Backers | |
| 2010/0147067 A1 | 6/2010 | Backes | |

FOREIGN PATENT DOCUMENTS

| | | |
|---|---|---|
| DE | 19830120 | 2/1999 |
| DE | 102004033734 | 2/2006 |
| DE | 69834347 | 5/2007 |
| DE | 202006005665 | 9/2007 |
| DE | 102007025987 | 1/2009 |
| DE | 102007036492 | 2/2009 |
| DE | 102007039349 | 2/2009 |
| DE | 102008020171 | 10/2009 |
| DE | 102008023845 | 2/2010 |
| DE | 102008061616 | 6/2010 |
| EP | 1068112 | 1/1999 |
| EP | 2120025 | 11/2009 |
| JP | 4147019 | 5/1992 |
| WO | 0326937 | 4/2003 |

* cited by examiner

OPTICAL SENSING DEVICE FOR DETECTING AMBIENT LIGHT IN MOTOR VEHICLES COMPRISING A PRISM STRUCTURE HAVING A PLURALITY OF PRISMS DESIGNED TO DIRECT RAYS OF A SPECIFIC AMBIENT LIGHT BEAM

RELATED APPLICATIONS

This application corresponds to PCT/EP20101006947, filed Nov. 15, 2010, which claims the benefit of German Application No. 10 2009 053 825.9, filed Nov. 18, 2009, the subject matter, of which are incorporated herein by reference in their entirety.

BACKGROUND OF THE INVENTION

The present invention relates to an optical sensor device for the detection of ambient light, which is adapted to be coupled to a pane, in particular to a windshield of a vehicle, according to the generic portion of claim 1.

Sensor devices of this type are made use of mainly as light sensors for controlling the vehicle lighting. The use of traditional lenses for influencing the optical path, such as, e.g., the lenses inclined against the windshield of the rain sensor shown in EP 1 068 112 B1, requires a comparatively large amount of installation space.

Smaller design shapes are possible when holographic structures are used, as known, e.g., from WO 03/026937 A1. These sensors are based on the principle of light diffraction with the aid of diffractive elements and therefore, resulting from this principle, have the disadvantage of a substantially lower useful light efficiency and a higher sensitivity to interfering light.

DE 196 08 648 C1 proposes that in an optical sensor device the light entry and light exit surfaces of the light guide unit be made in the form of Fresnel lenses. Since, however, the surfaces of the light guide in which the lenses are formed are perpendicular to the surface of the pane, the installation space required for this device is very large.

Further fundamental disadvantages of known optical ambient light sensor devices are found in the great manufacturing expenditure and in too narrow a reception range. The attempt to produce an extension in sensor devices having Fresnel lenses in that the light receiver is placed further away from or closer to the focal point of the Fresnel lens fails because the reception characteristic at the same time is split up into one or more further beams of rays far outside the intended reception range. The same holds true for the attempt to increase the receiver surface.

DE 20 2006 005 665 U1 discloses an optical rain sensor device including a cuboid lens plate arranged parallel to the windshield of a motor vehicle. The front of the lens plate facing the transmitter and the receiver of the device includes Fresnel steps which form two aspherical Fresnel lenses the optical axes of which are each inclined by about 45 degrees in relation to the windshield. The first Fresnel lens provides for a substantially parallel orientation of the rays of the light beam radiated by the transmitter, so that the rays are coupled into the windshield in the form of a light beam having a parallel orientation. The second Fresnel lens makes sure that the light beam coupled out of the windshield and still oriented parallel is focused onto the receiver.

DE 20 2007 036 492 A1 shows a directional daylight sensor configured as a generic optical sensor device. On its surface facing the light receiver, the lens plate of the device has Fresnel lens structures, and on the opposite surface facing the pane, it has Fresnel reflector structures. A light beam that impinges parallel on the pane passes through it at an angle and is then coupled into the lens plate through the Fresnel reflector structure and directed perpendicularly through the lens plate onto the Fresnel lens structure and is focused by the latter onto the light receiver. Basically, however, daylight sensors which are based on this Fresnel lens plate technology have a certain sensitivity in further, undesirable receiving directions in addition to the desired principal reception characteristic.

SUMMARY OF THE INVENTION

It is the object of the invention to attain a desired reception characteristic without the splitting that is typical of the Fresnel prism technology of the reception characteristic into a desired and an undesirable range taking place.

This object is achieved by an optical sensor device having the features of claim 1. Advantageous and expedient further configurations of the optical sensor device according to the invention are indicated in the dependent claims.

The optical sensor device according to the invention serves to detect ambient light and is adapted to be coupled to a pane, in particular to a windshield of a vehicle. The optical sensor device has a sensor unit which includes at least one light receiver for ambient light and a lens plate for directionally coupling an ambient light beam out of the pane onto the light receiver. The lens plate has a surface facing the light receiver and oriented substantially parallel to the pane in the coupled condition of the optical sensor device. The surface includes a prism structure having a plurality of single prisms which are designed to direct the rays of a specific ambient light beam defined by a principal direction and an aperture angle (preferably different from zero) onto the light receiver.

Since the optical sensor device according to the invention requires only this one prism structure for its function of detecting directional ambient light, the production is simplified and an extremely compact structural shape is possible.

Accordingly, the prism structure arranged on the surface of the lens plate facing the light receiver is advantageously configured such that it has an effect on the ambient light beam of a convergent lens having its focal point located on the light receiver.

The single prisms of the prism structure are preferably designed to focus rays of the ambient light beam which enter the lens plate at different angles, onto the light receiver. In other words, this means that the single prisms are allocated to different vertical angles of light incidence. Such a design of the single prisms allows the reception range of the sensor unit to be widened in a defined manner without a splitting into several light beams being produced.

The prism structure may be a linear structure in which rows of single prisms are arranged along parallel straight lines.

The prism structure may, however, also be a nonlinear, preferably rotatory structure in which rows of single prisms are arranged along parallel curves, in particular circular lines. In this case, the radii determine the horizontal aperture angle of the ambient light beam.

According to a further development of the invention, the lens plate may also include two or more prism structures with a plurality of single prisms on the surface facing the light receiver, the single prisms being designed to direct the rays of at least two ambient light beams having different principal directions onto the light receiver.

An embodiment in which two or more prism structures are at least partly integrated in each other (i.e. overlying each other) is particularly space-saving.

To protect the light receiver from any undesirable influence of extraneous light, according to an especially advantageous embodiment of the optical sensor device, a light lock that is opaque to ambient light is arranged around the prism structure on the surface facing the receiver. The light lock may be realized in various ways, for example in the form of a dark imprint or a dark layer of plastic material.

An optimum protection for the light receiver is produced by a configuration in which the light receiver, in relation to a normal to the first surface, intersecting the light receiver, is positioned behind the light lock.

In an advantageous embodiment of a rain/light sensor, there is also provided, in addition to the optical sensor device for ambient light according to the invention, an optical rain sensor device for detecting wetting incidents on the pane, the sensor devices sharing a common lens plate in which all of the prism structures are formed.

BRIEF DESCRIPTION OF THE DRAWINGS

Further features and advantages of the invention will be apparent from the description below and from the accompanying drawings, to which reference is made and in which.

DESCRIPTION OF EXEMPLARY EMBODIMENTS

Figure 1:
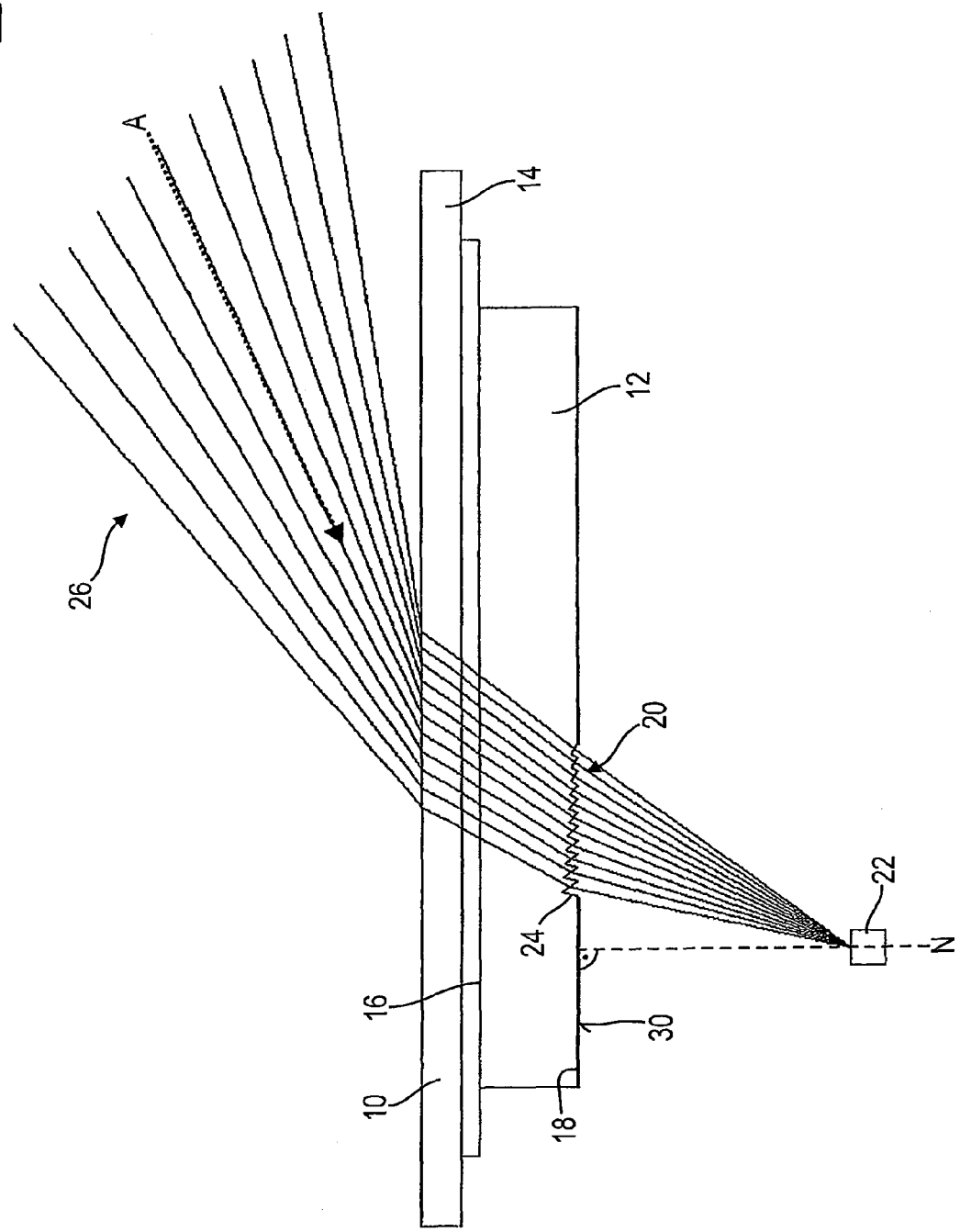
FIG. 1 shows a schematic sectional view of a sensor unit of an optical sensor device according to the invention.

The sensor unit illustrated in FIG. 1 for an ambient light sensor is provided for use in a motor vehicle and is attached to the windshield 10 of the vehicle. The optically active element of the sensor unit is a lens plate 12. The lens plate 12 is coupled mechanically and optically to the windshield 10 by means of a coupler 14 in that the material of the coupler 14 lies against a first surface 16 of the lens plate 12 facing the windshield 10, in a form-fitting manner and without an inclusion of air bubbles or the like. The first surface 16 is substantially planar and has no refractive or diffractive structures.

On a second surface 18 facing away from the windshield 10, the lens plate 12 is provided with a circular Fresnel prism structure 20. The second surface 18 of the lens plate 12 is otherwise oriented parallel to the first surface 16 and faces a light receiver 22 of the sensor unit. The prism structure 20 includes a multitude of specially designed refractive single prisms 24 the essential properties of which will be discussed further below.

An ambient light beam 26 impinging on the windshield 10 at an acute angle, as related to a principal direction A, is refracted obliquely downward when it enters the windshield 10. The light beam 26 is coupled out of the windshield 10 and into the lens plate 12 by the coupler 14 without a considerable refraction. The light beam 26 passing through the lens plate 12 impinges on the prism structure 20 at an angle, as related to the second surface 18 of the lens plate 12. The prism structure 20, more precisely the single prisms 24 thereof, are designed such that they have the effect of a convergent lens on the light beam 26 and focus the rays of the light beam 26. Situated in the focal point of the convergent lens formed in this way is the light receiver 22.

A further special feature of the prism structure 20 resides in that the reception range of the sensor unit is not restricted to a closely limited parallel light beam impinging on the windshield 10 at a particular angle. Rather, the prism structure 20 is designed such that the reception range is extended to a light beam converging with respect to the principal direction A. As can be seen from FIG. 1, the specially designed single prisms 24 of the prism structure 20 direct the rays of a predetermined ambient light beam 26 that is defined by the principal direction A and an aperture angle onto the light receiver 22, i.e. the single prisms 24 focus rays of the light beam 26 which enter the lens plate 12 at different angles, onto the light receiver 22.

To fulfill the two above-mentioned functions (convergent lens and reception range extension), the single prisms 24 of the prism structure 20 include suitably inclined surfaces for refraction and/or reflection of the rays of the light beam 26.

Figure 2:
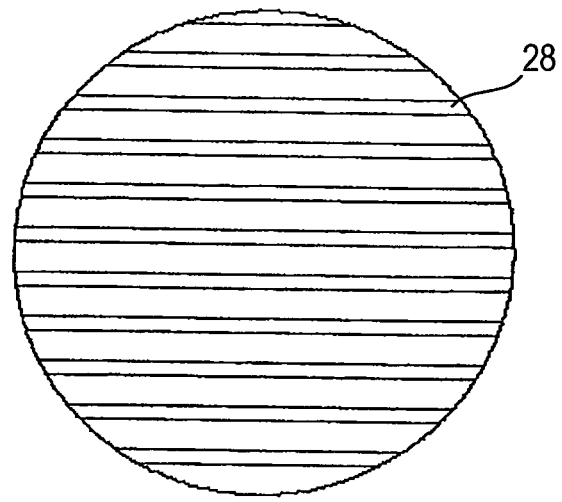
FIG. 2 shows a top view of a prism structure according to a first embodiment.

FIG. 2 shows a first embodiment of the prism structure 20, in which rows 28 of single prisms 24 are arranged along parallel straight lines. Such a structure may be referred to as linear prism structure.

Figure 3:
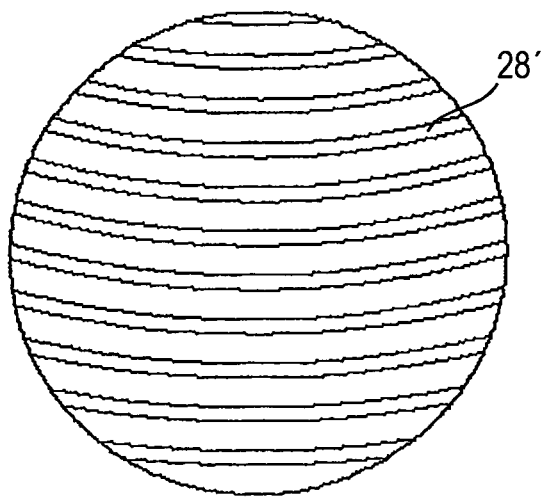
FIG. 3 shows a top view of a prism structure according to a second embodiment.

FIG. 3 shows a second embodiment of the prism structure 20, in which rows 28' of single prisms 24 are arranged along parallel curves, in particular along concentric circular lines, the radii determining the horizontal aperture angle of the detectable ambient light beam 26. Such a structure may be referred to as rotatory prism structure.

The lens plate 12 of the optical sensor device may also include two prism structures 20 on the second surface 18, e.g. one linear one and one rotatory one. The single prisms 24 of the two prism structures 20 are then designed such that they direct the rays of two ambient light beams 26 having different principal directions A onto the light receiver 22. The two prism structures 20 may also be integrated in each other (superposed).

Arranged around the prism structure 20 on the second surface 18 of the lens plate 12 is a light lock 30 that is opaque to ambient light. In the exemplary embodiment illustrated in FIG. 1, the entire second surface 18, with the exception of the prism structure 20, is overlaid with the light lock 30.

The light lock 30 protects the light receiver 22 from any undesirable incidence of extraneous light. To this end, the light receiver 22 is advantageously positioned behind the light lock 30, as related to a normal N to the second surface 18, intersecting the light receiver 22.

The lens plate 12 with the prism structure 20 may be produced using a conventional injection-molding technology. As an alternative, a stamping technique may be employed. The light lock 30 may in particular be a black print or a dark plastic material that is applied onto the lens plate 12 later (e.g., by overmolding) or is produced in a multi-component or multi-color injection molding procedure together with the lens plate 12.

In practice, combined rain/light sensors are required. A rain sensor contains a number of sensor units which, just like the sensor unit of the above-described ambient light sensor, require active optical structures. The special structure of the ambient light sensor allows the sensor units of the ambient light sensor and of the rain sensor to share a common lens plate 12, resulting in a minimum installation space. Where required, further sensor units may be provided in addition, which receive light from different directions and/or have different reception characteristics.

LIST OF REFERENCE NUMBERS 10 windshield
12 lens plate
14 coupler
16 first surface of the lens plate
18 second surface of the lens plate
20 prism structure
22 light receiver
24 single prisms
26 light beam
28, 28' rows of single prisms
30 light lock

The invention claimed is:

1. An optical sensor device for the detection of ambient light, which is adapted to be coupled to a pane (10), comprising a sensor unit which includes at least one light receiver (22) for ambient light and a lens plate (12) for directionally coupling an ambient light beam (26) out of the pane (10) onto the light receiver (22), the lens plate (12) having a substantially planar first surface (16) facing the pane (10) and a second surface (18) facing the light receiver (22) and oriented substantially parallel to the pane (10) in the coupled condition of the optical sensor device, wherein the second surface (18) includes a prism structure (20) having a plurality of single prisms (24) which are designed to direct the rays of a specific ambient light beam (26) defined by a principal direction (A) and an aperture angle onto the light receiver (22),
wherein the single prisms (24) include inclined surfaces that focus the rays of the ambient light beam (26) onto the light receiver (22), the single prisms (24) further including surfaces adjacent to the inclined surfaces, the surfaces adjacent to the inclined surfaces being oriented respectively parallel to the rays of the ambient light beam (26).

2. The optical sensor device according to claim 1, wherein the prism structure (20) arranged on the second surface (18) is configured such that it has an effect on the ambient light beam (26) of a convergent lens having its focal point located on the light receiver (22).

3. The optical sensor device according to claim 1 wherein the optical sensor device comprises only a single light receiver (22), the single prisms (24) of the prism structure (20) being designed to focus rays of the ambient light beam (26) which enter the lens plate (12) at different angles, onto the light receiver (22).

4. The optical sensor device according to claim 1, wherein the rays of the ambient light beam (26), as related to the second surface (18) of the lens plate (12), impinge on the prism structure (20) at an inclined angle.

5. The optical sensor device according to claim 1, wherein the prism structure (20) is a linear structure.

6. The optical sensor device according to claim 1, wherein the prism structure (20) is a nonlinear structure having rows of the plurality of single prisms arranged along parallel curves, the radii of the parallel curves determining a horizontal aperture angle of the ambient light beam (26).

7. The optical sensor device according to claim 1, wherein that a light lock (30) that is opaque to ambient light is arranged on the second surface (18) around the prism structure (20).

8. The optical sensor device according to claim 7, wherein the light receiver (22), in relation to a normal (N) to the second surface (18), intersecting the light receiver (22), is positioned behind the light lock (30).

9. The optical sensor device according to claim 1, wherein the lens plate (12) is coupled to the pane (10) by a coupler (14) that is in form-fitting contact with the prism structure (20).

10. The optical sensor device according to claim 1, wherein the optical sensor device includes a number of sensor units which have a shared lens plate (12).

11. A rain/light sensor, wherein an optical sensor device according to claim 1 is, combined with an optical rain sensor device, the sensor devices having a shared lens plate (12).

12. The optical sensor device according to claim 6, wherein the nonlinear structure is a rotary structure.

13. The optical sensor device according to claim 1, wherein the pane (10) is a windshield of a vehicle.

14. The optical sensor device according to claim 1, wherein the prism structure is provided on only the second surface.

15. The optical sensor device according to claim 1, wherein the first surface is free of any prism structure.

16. An optical sensor device for the detection of ambient light, which is adapted to be coupled to a pane (10), comprising a sensor unit which includes at least one light receiver (22) for ambient light and a lens plate (12) for directionally coupling an ambient light beam (26) out of the pane (10) onto the light receiver (22), the lens plate (12) having a substantially planar first surface (16) facing the pane (10) and a second surface (18) facing the light receiver (22) and oriented substantially parallel to the pane (10) in the coupled condition of the optical sensor device, wherein the second surface (18) includes a prism structure (20) having a plurality of single prisms (24) which are designed to direct the rays of a specific ambient light beam (26) defined by a principal direction (A) and an aperture angle onto the light receiver (22),
wherein the single prisms (24) include inclined surfaces that focus the rays of the ambient light beam (26) onto the light receiver (22), the rays of the ambient light beam (26) impinging on the pane (10) at an acute angle and being refracted obliquely downward when entering the pane (10), the rays of the ambient light beam (26) further being coupled out of the pane (10) and into the lens plate (12) by a coupler (14) substantially free of refraction and impinging on the prism structure (20) at an angle, as related to the second surface (18) of the lens plate (12).

17. The optical sensor device according to claim 16, wherein the prism structure (20) arranged on the second surface (18) is configured such that it has an effect on the ambient light beam (26) of a convergent lens having its focal point located on the light receiver (22).

18. The optical sensor device according to claim 16, wherein the optical sensor device comprises only a single light receiver (22), the single prisms (24) of the prism structure (20) being designed to focus rays of the ambient light beam (26) which enter the lens plate (12) at different angles, onto the light receiver (22).

19. The optical sensor device according to claim 16, wherein that a light lock (30) that is opaque to ambient light is arranged on the second surface (18) around the prism structure (20).

20. The optical sensor device according to claim 19, wherein the light receiver (22), in relation to a normal (N) to the second surface (18), intersecting the light receiver (22), is positioned behind the light lock (30).

* * * * *